US006969743B2

(12) United States Patent
Inagaki

(10) Patent No.: US 6,969,743 B2
(45) Date of Patent: *Nov. 29, 2005

(54) METHOD FOR UTILIZING SULFURIC ACID/PEROXIDE LIQUID MIXTURE

(75) Inventor: Yasuhito Inagaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 216 days.

This patent is subject to a terminal disclaimer.

(21) Appl. No.: 10/682,151

(22) Filed: Oct. 8, 2003

(65) Prior Publication Data

US 2004/0072958 A1    Apr. 15, 2004

Related U.S. Application Data

(62) Division of application No. 09/203,503, filed on Dec. 1, 1998, now Pat. No. 6,649,070.

(30) Foreign Application Priority Data

Dec. 1, 1997    (JP) ............................... P09-330158

(51) Int. Cl.[7] ............................................. C08C 19/20
(52) U.S. Cl. ...................... 525/344; 525/345; 525/346; 525/387; 525/374
(58) Field of Search ................................ 525/344, 345, 525/346, 387, 374; 210/749; 423/531; 521/33

(56) References Cited

U.S. PATENT DOCUMENTS

| 4,051,212 A | 9/1977 | Grigat et al. |
| 4,594,180 A | 6/1986 | Kobayashi et al. |
| 5,017,683 A | 5/1991 | Otani et al. |
| 5,032,218 A | 7/1991 | Dobson |
| 5,348,724 A | 9/1994 | Hagimori et al. |
| 5,356,602 A | 10/1994 | Tanjo et al. |
| 5,470,930 A | 11/1995 | Toba et al. |
| 5,549,833 A * | 8/1996 | Hagimori et al. ........... 210/757 |
| 6,649,070 B2 * | 11/2003 | Inagaki ....................... 210/749 |

FOREIGN PATENT DOCUMENTS

JP    5-102116    *    4/1993

OTHER PUBLICATIONS

Derwent Pub. No. XP002131083 & JP 080175810 A, Jul. 9, 1996, Nippon Sanso Corp.
Derwent Abstract Pub. No. XP002131084 & JP 08073206 A, Mar. 19, 1998, Nisso Eng. KK.

* cited by examiner

Primary Examiner—Roberto Rabago
(74) Attorney, Agent, or Firm—Sonnenschein, Nath & Rosenthal LLP

(57) ABSTRACT

A technique of utilizing a sulfuric acid/peroxide liquid mixture, for example, its waste liquid material, is to be developed so that the waste liquid can be re-utilized and effectively applied to obviate the problem resulting from disposal. To this end, there is provided a method for utilizing a sulfuric acid/peroxide liquid mixture, for example, its waste liquid, in which peroxide in the sulfuric acid/peroxide liquid mixture is decomposed to render it possible to utilize the liquid mixture as sulfuric acid.

6 Claims, No Drawings

METHOD FOR UTILIZING SULFURIC ACID/PEROXIDE LIQUID MIXTURE

REFERENCE TO CROSS-RELATED APPLICATIONS

The present application is a divisional of U.S. patent application Ser. No. 09/203,503 filed Dec. 1, 1998 now U.S. Pat. No. 6,649,070.

BACKGROUND OF THE INVENTION

1. Field of the Invention

This invention relates to a method for utilizing a sulfuric acid/peroxide liquid mixture. More particularly, it relates to a method for utilizing a sulfuric acid/peroxide liquid mixture that can be used with advantage as a method for re-utilization of a used-up sulfuric acid/peroxide liquid mixture.

2. Description of the Related Art

A sulfuric acid/peroxide liquid mixture is so far used in large quantities as a rinsing liquid for a semiconductor wafer mainly in semiconductor manufacturing processing in the form of a sulfuric acid/aqueous hydrogen peroxide or a sulfuric acid/ozone liquid mixture.

This sulfuric acid/peroxide liquid mixture is a representative rinsing solution used mainly for exfoliating a photoresist on a wafer or removing particles of metal, in particular heavy metal. This liquid mixture is used in significantly larger quantities than in the case of other rinsing solutions, such as ammonia/aqueous hydrogen peroxide, hydrochloric acid/aqueous hydrogen peroxide or dilute fluoric acid.

The result is that a large quantity of a waste liquid is generated after use. The waste solution of this liquid mixture presents the following problems in connection with disposal:

(i) If the waste liquid is mixed with water, significant heat evolution occurs (in connection with the heat of hydration of sulfuric acid);

(ii) peroxo acid (Caro's acid) exhibiting strong oxidating power is left; and (iii) aqueous hydrogen oxide is left such that vigorous foaming (oxygen yielding) is likely to occur as a result of impacts or mixing of impurities.

Due to the above-described problems of the heat evolution, abrupt rise in pressure caused by foaming, or to possibility of deterioration of the equipment due to oxidation, it has been retained to be difficult, in view of safety or maintenance, to transport the waste solution directly to purify it to sulfuric acid. Thus, according to a customary process, the waste solution is diluted and cooled with a large quantity of water, neutralized with an alkali such as slaked lime, agglomerated with an inorganic flocculant and with a high molecular flocculant, in this order, and finally allowed to flow into an effluent as waste water.

Since the amount of water or chemical agents, such as flocculants, are used in an amount which ultimately is tens to hundreds of that of the original sulfuric acid/peroxide liquid mixture, the processing cost, that is the equipment or maintenance cost, cost of the chemical agents or of disposal of sludge, is increased. If this is to be deemed to be unavoidable, the amount of the waste material is also increased prohibitively.

It has so far been felt that the waste sulfuric acid/peroxide liquid mixture cannot be disposed of except by causing it to flow into an effluent, without the possibility of its re-utilization.

SUMMARY OF THE INVENTION

In view that the disposal of the waste sulfuric acid/peroxide liquid mixture has many disadvantages, as described above, the present inventors have made attempts to develop a technique for efficiently re-utilizing the waste liquid and for suppressing the problem relating to its disposal. The present invention, completed in the course of these researches, is aimed to develop a technique of utilizing the sulfuric acid/peroxide liquid mixture, such as its waste liquid, and to provide a method for utilizing the waste liquid and for suppressing the problem relating to its disposal.

According to the present invention, there is provided a method for utilizing a sulfuric acid/peroxide liquid mixture including decomposing peroxide in the sulfuric acid/peroxide liquid mixture to utilize the liquid mixture as sulfuric acid.

Since the peroxide in the sulfuric acid/peroxide liquid mixture is decomposed to utilize the resulting liquid mixture as sulfuric acid, a waste liquid of the sulfuric acid/peroxide liquid mixture can be effectively re-utilized if the waste liquid is processed by this technique. This enables effective utilization of the waste liquid to suppress the problem raised in connection with disposal. The present invention, which provides an effective technique for the waste liquid of the sulfuric acid/peroxide liquid mixture in which sulfuric acid/peroxide is left as a component, can be applied to a sulfuric acid/peroxide liquid mixture other than a waste sulfuric acid/peroxide liquid mixture as a method for utilizing the sulfuric acid/peroxide liquid mixture if it is desired to utilize it as sulfuric acid.

The present invention is completed on the basis of the following information obtained by the present inventors. That is, the present inventors have conducted perseverant investigations to overcome the aforementioned problem and accordingly have found that, on adding a decomposition accelerator, such as nitric acid, to a sulfuric acid/peroxide liquid mixture, such as its waste liquid material produced from, for example, the semiconductor manufacturing process, the waste liquid material can be utilized as regenerated sulfuric acid. This finding has led to completion of the present invention.

According to the present invention, the novel method for utilizing the sulfuric acid/peroxide liquid mixture is provided whereby it is now possible to utilize the waste liquid material of the sulfuric acid/peroxide liquid mixture as sulfuric acid. The result is that the waste liquid need not be disposed of to render it possible to make effective utilization of resources and to reduce the amount of the waste material, such as effluent water. Moreover, with the present invention, the peroxide can be completely decomposed without lowering the concentration of sulfuric acid in the liquid waste material. The resultant product can be as a modifier, such as a sulfonating agent or a hydrolysis accelerator, for a variety of compounds, such as polymers. The decomposed liquid obtained on decomposing the peroxide can be used as a modifier for the waste resin material, whereby the waste material can be converted to a high added-value material to contribute to maintenance of global environment through reduction of the waste material and effective utilization of resources.

DESCRIPTION OF THE PREFERRED EMBODIMENTS

The present invention will be explained with reference to a preferred embodiment which is merely illustrative and is not intended to limit the scope of the invention.

The present invention exploits the sulfuric acid/peroxide liquid mixture as sulfuric acid by decomposing the peroxide in the sulfuric acid/peroxide liquid mixture and finds most effective application in case the sulfuric acid/peroxide liquid mixture represents a waste liquid resulting from various fields of use of the sulfuric acid/peroxide liquid mixture because the various problems caused by disposal can then be obviated.

According to the present invention, the sulfuric acid contained in the sulfuric acid/peroxide liquid mixture has a concentration not lower than 70 wt %, preferably not lower than 80 wt %. The reason is that, if the sulfuric acid concentration is less than 70 wt %, peroxides are not liable to be decomposed even on addition of a decomposition accelerator as later explained.

There is no particular limitation to the fields of application to which were put the sulfuric acid/peroxide liquid mixtures in use. In general, the sulfuric acid/peroxide liquid mixtures are preferably derived from a variety of rinsing processes. For example, the sulfuric acid/peroxide liquid mixtures used as a rinsing liquid for various parts or products in the electrical field, in particular those used in the production process of semiconductors for resist exfoliation or as a variety of rinsing liquids, are preferred because the sulfuric acid in the waste sulfuric acid/peroxide liquid mixture used in the semiconductor manufacturing process usually has a concentration of 70 wt % or higher.

The peroxides in the sulfuric acid/peroxide liquid mixture may be enumerated by hydrogen peroxide, ozone and peroxo acid (Caro's acid). It is noted that peroxo sulfuric acid is usually generated by injecting aqueous hydrogen peroxide or ozone gas into sulfuric acid.

There is no particular limitation to the concentration of the peroxides in the sulfuric acid/peroxide liquid mixture. In general, this concentration is preferably 0.001 ppm to 20 wt % and more preferably 0.01 ppm to 10 wt %. There is no particular problem if plural components other than sulfuric acid and peroxides, such as water, inorganic acid, surfactants or decomposition stabilizers are contained in the liquid mixture in addition to sulfuric acid and peroxides. The sum of the contents of these third components is preferably not larger than 30 wt % because the contents of these third components higher than this tends to obstruct decomposition of peroxides in the liquid mixture.

There is no particular limitation to the temperature at the time of decomposition of the peroxides of the sulfuric acid/peroxide liquid mixture. There is raised no particular problem if the decomposition temperature is in a range from 0° to 180° C. which is the usual using temperature of the sulfuric acid/peroxide liquid mixture. In general, the higher the temperature of the liquid mixture, the faster is the decomposition or foaming speed of the peroxides at the time of decomposition.

It is desirable to add one or more of nitric acid, fuming nitric acid, nitrogen dioxide, nitrate compounds or hydrochloric acid to the sulfuric acid/peroxide liquid mixture as a decomposition accelerator for the peroxides contained therein. There is no particular limitation to the concentration of these compounds which moreover may not as yet be used or already used. From the viewpoint of effective utilization of resources, used compounds are preferred. For the same reason, waste liquids of any one of the aforementioned decomposition accelerators, used as wafer rinsing liquids in the semiconductor manufacturing process, are preferably used as the decomposition accelerators for the present process. The amount of addition of the decomposition accelerators to the sulfuric acid/peroxide liquid mixture can be suitably set depending on the sort or the concentration of the peroxides or the liquid temperature. In general, the amount of addition of the decomposition accelerator to the weight of the liquid mixture is preferably 0.001 ppm to 10 wt % and more preferably 0.01 ppm to 5 wt %. If, when adding the decomposition accelerator, the liquid mixture is stirred sufficiently, the decomposition accelerator can be diffused readily thus assuring an increased decomposition speed or a reduced amount of addition of the decomposition accelerator.

The above-described decomposition reaction can occur at a use point of the liquid mixture, such as at a use position in the wafer rinsing vessel of the semiconductor manufacturing process, or in a device dedicated to the decomposition reaction. Since a large amount of gases, mainly oxygen gases, are usually generated in the present decomposition reaction to yield the heat of decomposition, it is desirable to provide a stirring function for lowering the heat of decomposition and/or a cooling function or to take suitable countermeasures, such as pressure-resistant structures or provision of a pressure releasing line, against rise in liquid surface due to foaming gas or against rise in pressure.

For realizing more effective decomposition, it is advisable to inject the decomposition accelerator dropwise in the stirred-up state of the liquid mixture. This decomposition reaction is generally extremely high in reaction speed, such that, if the decomposition accelerator is injected at a time, the foaming or heat generating reaction tends to be difficult to control.

By the above processing, decomposition of the peroxides in the sulfuric acid/peroxide liquid mixture is completed in a shorter time, such that the processing liquid can be re-used as sulfuric acid. For example, the as-processed liquid can be re-used as a strong acid, or a sulfonating agent. For example, sulfuric acid obtained from the sulfuric acid/peroxide liquid mixture in this manner can be used as a sulfonating agent for the high-molecular compound, or for the hydrolysis reaction of the high-molecular compounds.

An extremely small quantity of the decomposition accelerator can exhibit its effect, so that sulfuric acid in the sulfuric acid/peroxide liquid mixture can hardly be lowered. This significantly improves the regeneration efficiency at the time of purifying the processing liquid following the decomposition to yield sulfuric acid to facilitate regeneration as concentrated sulfuric acid, while lowering the cost.

Moreover, the processing liquid from the decomposition process can be used in the as-decomposed state as sulfuric acid. For example, the as-decomposed processing liquid can be used as a sulfonating agent for various compounds, as sulfonating agents for unsaturated compounds containing aromatic compounds, halogens, alcohols or compounds containing acid anhydride groups, in particular hydrocarbon-based organic compounds, or as hydrolysis accelerators for various compounds. More specifically, the processing liquid can be used for synthesis of alkyl benzene sulfonate (ABS). The above-enumerated compounds can be used as dispersants for a variety of materials, that is surfactants, or as anti-static agents.

The processing liquid can also be reacted with polystyrene to yield polystyrene sulfonates and sodium salts thereof which can be used as a variety of dispersants, for example, as a dispersant for cement or coal-aqueous slurry, as a heat-resistant thermoplastic resin, as an anti-static agent, such as that for paper, resin or fibers, as a flocculent, such as that for processing the effluent, or as paste or ion exchange resins. The processing liquid can also be reacted with lignin to yield lignin sulfonic acid and salts thereof effective as a dispersant for cement. The processing liquid can hydrolyze acrylonitrile groups in the ABS resin, SAN resin or PAN resin to modify the resulting hydrolysates for use as a hygroscopic resin.

The compounds, such as organic compounds, processed with the as-decomposed processing liquid, may be pre-use compounds or used compounds, that is a waste material. From the viewpoint of effective utilization of resources, it is more preferred to use the waste materials as a starting material. For example, a used plastic waste material can be preferably used as a starting material.

The above processing enables the peroxides in the waste liquid of the used sulfuric acid/peroxide liquid mixture to be decomposed efficiently, thus facilitating recovery of the high-concentration sulfuric acid. The recovered sulfuric acid can not only be used on purification thereof as regenerated sulfuric acid but also can be used as sulfonating agent or as hydrolysis accelerator for various compounds, such as various organic compounds.

In the conventional practice, large amounts of water and chemical agents are required for processing the sulfuric acid/peroxide liquid mixture thus ultimately producing a large amount of the waste materials. The amount of the waste material can now be reduced significantly. Moreover, the liquid mixture, so far discarded, can be converted to products with a high added-value. In addition, the plastic waste materials, so far discarded, can similarly be converted to products with a high added-value.

It will be seen from above that, by exploiting the technique according to the present invention, saving in resources or recycling can be realized to reduce the amount of waste material thus contributing to maintenance of global environment.

The present invention will be explained with reference to several preferred Examples which are merely illustrative and are not intended to limit the invention. In the Examples 1 and 2, specified cases of decomposition of peroxides in the waste liquid of the sulfuric acid/peroxide liquid mixture are shown. Similarly, in Examples 3 to 9, specified cases of utilizing decomposition products of the sulfuric acid/peroxide liquid mixture are shown along with Comparative Examples. In the following Examples, in which decomposition of peroxides in the sulfuric acid/peroxide liquid mixture and utilization of a decomposition product thereof are shown, the following waste sulfuric acid/peroxide liquid mixtures (a) and (b) are used for evaluation:

(a) a waste liquid of a sulfuric acid/peroxide liquid mixture used as a rinsing liquid for pre-processing prior to oxide film formation of the semiconductor manufacturing process (pre-step) (initial mixing ratio of $H_2SO_4/H_2O=5:1$ in volume ratio, use temperature of 80° C., with a small quantity of aqueous hydrogen peroxide being supplemented in use); and (b) a waste liquid of a sulfuric acid/ozone liquid mixture used as a resist liquid for resist exfoliation in the semiconductor manufacturing process (pre-step) (concentrated sulfuric acid with an ozone gas blown therein, using temperature: 110°).

The original concentration of sulfuric acid and that of aqueous hydrogen oxide are 96 wt % and 30 wt %, respectively.

EXAMPLE 1

5 lit of the waste liquid (a) were injected into a reaction vessel fitted with a stirrer and a cooling equipment and were cooled to the water temperature. Five drops of a waste liquid of fuming nitric acid, used as a resist-exfoliating liquid downstream of the metal interconnection step in the semiconductor manufacturing process, each drop weighing approximately 0.2 g, were applied thereto under agitation. From the site of dropwise addition of nitric acid, foaming ascribable to decomposition of peroxides occurred and disappeared in approximately two minutes. The residual quantity of aqueous hydrogen peroxide in the liquid before and after the reaction of decomposition was analyzed. It was found that the residual amount which was approximately 1 wt % was decreased to 10 ppm or less after decomposition. The concentration of sulfuric acid in the decomposed liquid, obtained upon decomposition, was 82 wt %. This sulfuric acid, obtained on purification, could be re-used as industrial sulfuric acid.

EXAMPLE 2

To 20 lit of the waste liquid (b), at 110° C., contained in a wafer rinsing vessel fitted with a circulation filter, were added dropwise seven drops of 10 wt % sulfuric acid, with each drop weighting 0.3 g. from the position of dropwise addition of nitric acid, foaming occurred due to decomposition of peroxides, as in the case of Example 1. This foaming disappeared in approximately one minute. A resist solution was added dropwise to the waste liquid before and after decomposition. As for the solution before decomposition, the entire liquid turned to pale yellow directly after injection of the resist solution and again was transparent as before within about three minutes. As for the solution after decomposition, the pale yellow color was maintained. The reason is that the present processing completed the decomposition of the peroxide in the waste liquid. The concentration of sulfuric acid in the decomposed liquid obtained on decomposition was 90 wt %. The purified sulfuric acid could be re-used as industrial sulfuric acid, as in Example 1.

EXAMPLE 3

To 5 g of the decomposed solution obtained in Example 1 (sulfuric acid concentration: 82 wt %) was added 0.2 g of a waste material of a gray portion (ABS resin) of an 8 nm cassette tape guard panel and a reaction was carried out at 80° C. for 60 minutes. After the end of the reaction, a solid product was recovered and washed with water until the acid content was depleted. The resulting gelated product was dried at 80° C. for two hours. The resulting black solid mass exhibited a hygroscopic effect approximately 100 times and approximately 50 times its own weight for pure water and for artificial urine, respectively.

EXAMPLE 4

The reaction was carried out under the same conditions as in Example 3 using a transparent styrene-acrylonitrile (SAN) resin as a starting material and a decomposed liquid obtained in Example 2 (sulfuric acid concentration: 90 wt %). The resulting transparent solid mass exhibited a hygroscopic effect approximately 150 times and approximately 70 times its own weight for pure water and for artificial urine, respectively.

COMPARATIVE EXAMPLE 3' (COMPARATIVE EXAMPLE FOR EXAMPLE 3)

The sulfuric acid/peroxide liquid mixture (a) was used. That is, a waste liquid not processed with the oxide decomposition was used. Otherwise, the reaction was carried out under the same conditions as in Example 3. In this case, the waste resin material was decomposed completely by the residual peroxide and could not be modified to a hygroscopic resin.

COMPARATIVE EXAMPLE 4' (COMPARATIVE EXAMPLE FOR EXAMPLE 4)

The sulfuric acid/peroxide liquid mixture (b) was used. That is, a waste liquid not processed with the oxide decomposition was used. Otherwise, the reaction was carried out under the same conditions as in Example 4. In this case, the waste SAN resin material again could not be modified to the hygroscopic resin, as in the Comparative Example 3'.

EXAMPLE 5

To polystyrene dissolved in 1,2-dichloroethane (Mw=ca. 280,000) was added the decomposed liquid obtained in Example 1 (sulfuric acid concentration: 82 wt %) and acetic anhydride (molar ratio, 1:1:2) to carry out the heating reaction at 60° C. for five hours. After the end of the reaction, the reaction product was poured into heated water for rinsing and re-precipitation. The resulting precipitate was dried to a 10 mol % sulfonated polystyrene (SPS). The sulfonating ratio was adjusted with the charging ratio of recovered sulfuric acid. The produced sulfonated polystyrene (SPS) was dissolved in tetrahydrofuran. To the resulting solution was added an aqueous solution of sodium hydroxide in an equimolar amount to sulfone groups in sulfonated polystyrene (SPS). The resulting solution was recovered and dried to sulfonated polystyrene sodium (SPS-Na). The glass transition temperature (Tg) of the produced sulfonated polystyrene sodium (SPS-Na) was improved by approximately 40° C. as compared to that of the polystyrene of the starting material (approximately 100° C.). That is, polystyrene could be rendered heat-resistant by the present processing.

EXAMPLE 6

The processing was carried out in the same way as in Example 5 except using a waste material of a housing for a CD-ROM driver (polystyrene-polyphenylene ether alloy; containing carbon black). The glass transition temperature (Tg) of the produced resin was improved by approximately 30° C. as compared to that of the starting waste material.

COMPARATIVE EXAMPLE 6' (COMPARATIVE EXAMPLE FOR EXAMPLE 6)

here, the sulfuric acid/ozone liquid mixture was used. Otherwise, the reaction was carried out under the conditions of Example 6. In this case, expanded waste styrene material was completely decomposed in the course of the sulfonating reaction.

EXAMPLE 7

Polystyrene beads cross-linked with 5%-divinyl benzene were injected into the decomposed liquid obtained in Example 2 to carry out sulfonation at 80° C. for 15 hours. After the end of the reaction, the sulfonated product was rinsed with a large quantity of water to give a cation exchange resin.

EXAMPLE 8

18 g of the decomposed liquid obtained in Example 1, 8 g of polystyrene (Mw= 10,000) and 8 g of naphthalene were mixed together to carry out the reaction at 150° C. for five hours. The reaction mass was cooled to 90° C. and added to with 10 g of water. The resulting mass was reacted at 100° C. for five hours under dropwise addition of 7 g of 37%-formalin. After the reaction, 30 g of water and 10 g of a 48%-aqueous solution of sodium hydroxide were added to the reaction system. The resulting product was stirred at 80° C. for 30 minutes, added to with 5 g of calcium hydroxide and stirred for one hour. The ultimate product, obtained on filtration, could be used as a dehydrating agent for cement or as a dispersant for a coal-water slurry.

EXAMPLE 9

To 70 g of cyclohexane contained in a reaction vessel, maintained at 50° C., 12 g of the decomposed liquid obtained in Example 1 and a solution obtained on dissolving a waste material of expanded styrene in 68 g of cyclohexane under heating were added dropwise simultaneously over 60 minutes. The reaction was then carried out for one hour as the temperature was maintained at 50±2° C. With progress of the reaction, a slurry-like product was generated in the reaction liquid. An aqueous solution of sodium hydroxide was gradually added to the reaction system under agitation for neutralization. Th solvent cyclohexane in the reaction system was then distilled off under heating. The residual aqueous solution was ultimately adjusted to pH 8 with sodium hydroxide to yield a 10 wt % of an aqueous solution of high molecular electrolyte. The so-produced water-soluble high molecular electrolyte could be used as a high-molecular flocculant or a dehydrator for processing plant effluent or sewage water.

What is claimed is:

1. A method for reusing sulfuric acid contained in a waste liquid mixture comprising sulfuric acid and peroxide, the waste liquid mixture being generated in a semiconductor manufacturing process, the method comprising:
   collecting the waste liquid mixture;
   decomposing the peroxide of the waste liquid mixture by adding an accelerator comprising nitric acid to the waste liquid mixture to produce a second liquid mixture comprising sulfuric acid;
   recovering the second liquid mixture; and
   using the second liquid mixture to modify a resin by treating the resin with the second liquid mixture, thereby using the sulfuric acid contained therein.

2. The method of claim 1, wherein the waste liquid mixture comprises not less than 70 wt % sulfuric acid.

3. The method of claim 1, wherein the peroxide of the waste liquid mixture is selected from the group consisting of hydrogen peroxide ozone gas, peroxo sulfuric acid and mixtures thereof.

4. The method of claim 1, wherein the step of reusing the sulfuric acid comprises using the sulfuric acid as a sulfonating agent.

5. The method of claim 1, wherein the step of using the second liquid mixture further comprises using the sulfuric acid of said second liquid mixture in a sulfonating reaction.

6. The method of claim 1, wherein the step of using the second liquid mixture further comprises using the sulfuric acid of said second liquid mixture in a hydrolysis of a high-molecular weight compound.

* * * * *